(12) United States Patent
Deshmukh (10) Patent No.: US 7,996,371 B1
(45) Date of Patent: Aug. 9, 2011

(54) COMBINING CONTEXT-AWARE AND CONTEXT-INDEPENDENT DATA DEDUPLICATION FOR OPTIMAL SPACE SAVINGS

(75) Inventor: Vijay Deshmukh, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 462 days.

(21) Appl. No.: 12/136,549

(22) Filed: Jun. 10, 2008

(51) Int. Cl.
*G06F 17/30* (2006.01)

(52) U.S. Cl. ........ 707/692; 707/736; 707/770; 707/831; 707/999.1; 711/156

(58) Field of Classification Search .................. 707/831, 707/770, 736, 692, 999.1; 711/118, 156; 717/162
See application file for complete search history.

(56) References Cited

U.S. PATENT DOCUMENTS

| | | | | |
|---|---|---|---|---|
| 7,143,091 B2 * | 11/2006 | Charnock et al. | ...................... | 1/1 |
| 7,152,060 B2 * | 12/2006 | Borthwick et al. | ........... | 707/770 |
| 7,296,011 B2 * | 11/2007 | Chaudhuri et al. | ................... | 1/1 |
| 7,631,155 B1 * | 12/2009 | Bono et al. | ..................... | 711/156 |
| 7,640,262 B1 * | 12/2009 | Beaverson et al. | ................... | 1/1 |
| 7,657,540 B1 * | 2/2010 | Bayliss | ...................... | 707/999.1 |
| 7,673,099 B1 * | 3/2010 | Beaverson et al. | ........... | 711/118 |
| 7,720,846 B1 * | 5/2010 | Bayliss | ......................... | 707/736 |
| 7,720,892 B1 * | 5/2010 | Healey et al. | ................. | 707/831 |
| 7,814,470 B2 * | 10/2010 | Mamou et al. | ................. | 717/162 |
| 7,899,796 B1 * | 3/2011 | Borthwick et al. | ........... | 707/692 |

OTHER PUBLICATIONS

Interactive deduplication using active learning, 2002, ACM, Sarawagi et al.*
Deduplication at the source and target, 2011.*

* cited by examiner

*Primary Examiner* — Jean M Corrielus
(74) *Attorney, Agent, or Firm* — Cooper Legal Group, LLC (57) ABSTRACT

A storage system includes a storage operating system configured to provide two-step data deduplication in which, during a data storage operation and prior to committing data to a storage medium of the storage system, context-aware data deduplication is performed on the data to obtain context-aware deduplicated data, and, subsequent to committing the context-aware deduplicated data to the storage medium, a context-independent data deduplication operation is performed on the context-aware deduplicated data to obtain context-independent deduplicated context-aware deduplicated data, for commitment to the storage medium.

18 Claims, 4 Drawing Sheets

COMBINING CONTEXT-AWARE AND CONTEXT-INDEPENDENT DATA DEDUPLICATION FOR OPTIMAL SPACE SAVINGS

FIELD OF THE INVENTION

The present invention relates to the removal of duplicate data and, more particularly, to managing the removal of duplicate data in storage systems.

BACKGROUND

For as long as computer systems have been in use, there has been a need to store data associated with such systems. The data may be intended for input to a computer system (e.g., for processing by that system as part of its operation under the control of one or more application programs), temporary data produced by the computer system (e.g., in the form of intermediate results of calculations while operating on the input data), or produced as output by the computer system (e.g., as a result of the operations on the input data and/or the intermediate results). As the volume of information processed by computer systems has increased, so too has the need for efficient means of storing that data.

Because infinite resources for storing data do not exist, there have been developed several approaches for reducing the volume of data to be stored. One such approach is compression of the data from one form to another, with the resulting form requiring less storage space than the original form. Data compression schemes operate by applying mathematical algorithms to data in order to simplify large or repetitious parts of a data object—effectively making that object smaller. In such a scheme, for a given finite storage space more total data can be stored if the data is first compressed than otherwise would be the case. Of course, this scheme is only useful if the data can be recovered (or decompressed) sufficiently to discern the original information content. Many compression techniques have been developed to allow for such operations.

An alternative to data compression is data deduplication. Like compression, data deduplication is an approach for reducing the volume of data to be stored. Indeed, data deduplication is sometimes called "intelligent compression" because it reduces storage needs by eliminating redundant data. That is, only one unique instance of any data object is actually retained on a storage medium, such as disk or tape. Redundant data is replaced with a pointer to the unique instance thereof.

As an example, consider a corporate email system in which there are 100 instances of a single email containing a one megabyte (MB) attachment. If the email system is backed up or archived, all 100 instances of the subject email (each having a copy of the attachment) are saved. Thus, 100 MB of storage space are required just for this single email. The situation may be somewhat improved if data compression techniques are employed prior to the archiving operation, but there will still exist 100 instances of the email and its attachment. The total storage space required will be some fraction of 100 MB (determined in large part by the degree to which the attachment can be compressed), but still much greater than just the 1 MB occupied by a single copy of the email. With data deduplication, however, only a single instance of the subject email and its attachment is actually stored. For all other copies of the email, all that is stored is a reference or pointer to the one saved copy. In this example then, a 100 MB storage demand could be reduced to only 1 MB.

While data deduplication provides benefits in terms of reducing the storage space needed to archive information, there are drawbacks to these techniques. Notably, data deduplication processes can consume significant time and processing resources. This is because different data deduplication processes operate at different levels of information objects (e.g., the file, block, or even the bit level), and must analyze each new instance of those information objects to determine if they match existing copies thereof before committing the information objects to a storage medium. For large volumes of data, these processes can take a long time to complete, especially if the deduplication processes operate at the level of very small data objects.

Consider, for example, the difference between data deduplication at the file level and at the bit or block level. File level data deduplication is relatively straightforward: one copy of the file is stored, but each subsequent iteration of the file is replaced by a pointer to the already saved copy. Because the data is being saved within the context of its data container (i.e., the file), this form of data deduplication is referred to as context-aware data deduplication. Such processes generally operate quickly, but space savings tend to be limited because the change of even a single bit within the data object results in a totally different copy of the entire object being stored.

By comparison, data deduplication at the block level examines the data within a data object (e.g., a file) and saves unique instances of each block. Blocks can, of course, be of varying size depending upon the type of data being stored or the type of storage system. Now, if a data object (such as a file) is updated, it is likely that many of the individual blocks within that data object will remain unchanged and so only the changed blocks need by saved as new instances. The unchanged blocks can still be replaced by pointers to the previously saved instances thereof. This behavior makes block-level (or context-independent) data deduplication more efficient than context-aware data deduplication, but it requires more processing power and takes longer than its context-aware counterpart (in part because context-independent data deduplication uses a much larger index to track individual data blocks than is needed to track entire files).

SUMMARY OF THE INVENTION

The present invention combines the use of a context-aware data deduplication process (e.g., a process that operates at a data container, for example a file, level) with a context-independent (e.g., a process that operates at a block, byte or other level) data deduplication process in the environment of a single data backup operation. The use of such a two-step data deduplication process in the manner prescribed by the present invention can achieve significant space savings for storage systems at speeds faster than that offered by context-independent data deduplication systems alone.

In one embodiment of the invention, a context-aware data deduplication (e.g., data container (e.g., a file)-level data deduplication) is performed during a data backup operation prior to committing the data to a storage medium. Subsequently, a context-independent data deduplication (e.g., block-level data deduplication) operation is performed. The context-aware data deduplication operation may be performed in response to an indication from a backup management module that the backup operation is to commence and the context-independent data deduplication operation may be performed in response to an indication from the backup management module that the data has been committed to the storage medium.

The result of the context-aware data deduplication operation may be described as context-aware deduplicated data and the result of the context-independent data deduplication operation may be described as context-independent deduplicated context-aware deduplicated data. The context-aware deduplicated data is produced before any data is committed to a storage medium and the context-independent deduplicated context-aware deduplicated data is produced after the context-aware deduplicated data is committed to the storage medium.

In some embodiments, the entire data storage operation may be a data backup operation for a storage system. The context-aware data deduplication is performed in response to an indication from a backup management module that the data storage operation is to commence. Also, the context-independent data deduplication operation may be performed in response to an indication from the backup management module that the context-aware deduplicated data has been committed to the storage medium.

In some instances, the context-aware data deduplication involves comparing data container level objects in the data with previously stored versions thereof on the storage medium, and, for each instance of an identical copy of said data container level objects already stored to storage medium, creating a pointer to a respective existing copy of a subject data container level object and storing the pointer in lieu of the subject data container level object as part of the data storage operation. The data container level objects may be compared using representations of the data container level objects, for example hashes of the data container level objects. Likewise, the context-independent data deduplication may involve comparing data objects smaller than a data container in the context-aware deduplicated data with previously stored versions thereof on the storage medium and, for each instance of an identical copy of said data objects already stored to storage medium, creating a pointer to a respective existing copy of a subject data object and storing the pointer in lieu of the subject data object as part of the data storage operation. Such comparisons may involve the use of representations of the data objects, for example hashes of the data objects.

A further embodiment of the invention provides a storage system that includes a processor communicatively coupled to a memory, which stores a storage operating system. The storage operating system may include a data deduplication module configured to provide two-step data deduplication in which, during a data storage operation and prior to committing data to a storage medium of the storage system, context-aware data deduplication is performed on the data to obtain context-aware deduplicated data, and subsequent to committing the context-aware deduplicated data to the storage medium, a context-independent data deduplication operation is performed on the context-aware deduplicated data to obtain context-independent deduplicated context-aware deduplicated data, for commitment to the storage medium. The storage operating system may further include a backup management module configured to signal the data deduplication module to perform the context-aware data deduplication (e.g., in response to an indication a data transfer from a data source is about to begin) and the context-independent data dedulpication (e.g., in response to an indication that the context-aware deduplicated data has been committed to the storage medium). The data deduplication module may be included within a file system for the storage operating system.

Various embodiments of the present invention provide computer-readable media having stored thereon computer-readable instructions for performing the above-described process, as further explained and exemplified below.

BRIEF DESCRIPTION OF THE DRAWINGS

The present invention is illustrated by way of example, and not limitation, in the figures of the accompanying drawings in which.

DETAILED DESCRIPTION

Described herein are methods and systems for managing data deduplication in data storage systems. Data deduplication essentially refers to the elimination of redundant data. For example, rather than storing two identical copies of a data object or container, data deduplication processes allow one copy of the object or container to be stored while all other iterations thereof are replaced by pointers to the saved instance. Data deduplication processes rely on fundamentals of how data is stored. Regardless of operating system, application, or file-system type, all data objects are written to a storage system using a reference pointer. Data deduplication systems exploit this fact by causing pointers to be rewritten so that otherwise redundant data is identified by a pointer to a single instance of that data stored on the storage device. A variety of techniques can be used to implement this facility. Nevertheless, most data deduplication systems implement one of two processes: either a context-aware deduplication process or a context-independent process. Context-aware processes perform deduplication at a data container (e.g., a file) level and generally operate quickly. The space savings, however, tend to be limited. Context-independent deduplication systems can achieve significant space reduction in as much as they operate at the data block level, however, they tend to be slower and require significant processor resources. The present invention combines the use of a context-aware data deduplication process (e.g., a process that operates at a data container, for example a file, level) with a context-independent (e.g., a process that operates at a block, byte or other level) data deduplication process in the environment of a single data backup operation. The use of both such data deduplication processes in the manner prescribed by the present invention can achieve significant space savings for storage systems at speeds faster than that offered by context-independent data deduplication systems alone. It should be remembered, however, that although the following discussion will refer to certain illustrated embodiments, the present invention is not intended to be limited by those examples. Instead, the invention should be measured in accordance with the claims following this description.

As mentioned, the present invention combines the use of context-aware and context independent data deduplications processes in the environment of a single data backup operation. By context-aware data deduplication it is meant that the data deduplication operation is performed at the data container level. In contrast, context-independent data deduplication involves data deduplication at the data block (or lower)

level, without regard to data container boundaries. Context-aware data deduplication is a relatively rapid process and thus allows data container-level redundancies to be eliminated quickly before data is committed to a storage medium. On the other hand, context-independent data deduplication can be a relatively slow process, but can achieve greater storage space savings than context-aware data deduplication because it operates at very fine levels of data groupings. For example, context-independent data deduplication may involve data deduplication at the block level, without regard to data container boundaries. Thus, the deduplication may involve homogeneous blocks of heterogeneous data containers. Redundancies between such blocks may be eliminated by substituting address pointers for duplicate blocks and deleting the duplicate block from the storage system (e.g., by making it as available for overwriting).

In one embodiment of the invention, the context-aware data deduplication operation is performed prior to commencement of the data backup operation and the context-independent data deduplication operation is performed after the subject data has been committed to a storage medium (e.g., a disk). As indicated above, combining these two data deduplication processes in the manner of the present invention provides the advantage of the relatively speedy context-aware data deduplication process with the significant space reduction benefits afforded by the context-independent data deduplication process.

Before describing the details of the data deduplication processes of the present invention, it is helpful to briefly review the storage system context in which these methods operate. As the term is used herein, a storage system may be generally regarded as a computer system that is configured to provide storage services relating to the organization of information on storage devices, such as disks of a disk array (e.g., a Redundant Array of Independent (or Inexpensive) Disks (RAID)). Clients (which may also be computer systems) communicate with the storage system (e.g., via one or more communication links or networks) to make use of the storage services. For example, clients may write information to and/or read information from the storage system. These read and write accesses may be at the level of individual data containers (such as files and directories) or at lower data object levels (such as blocks).

In order to provide the storage services, the storage system operates under the control of a storage operating system—computer-executable instructions operable to perform storage functions (e.g., managing accesses to the storage media) in response to client requests. One or more modules of such a storage operating system may be configured to provide the data deduplication processes of the present invention. Moreover, the storage system may implement a high-level module, such as a file system, to logically organize the information stored on the storage devices. That information may be organized in one or more storage volumes that span a collection of physical storage devices. Each such volume is generally, although not necessarily, associated with its own file system. In this context, a file system is a means for storing and organizing data containers and the data they contain to make it easy to find and access them.

Figure 1:
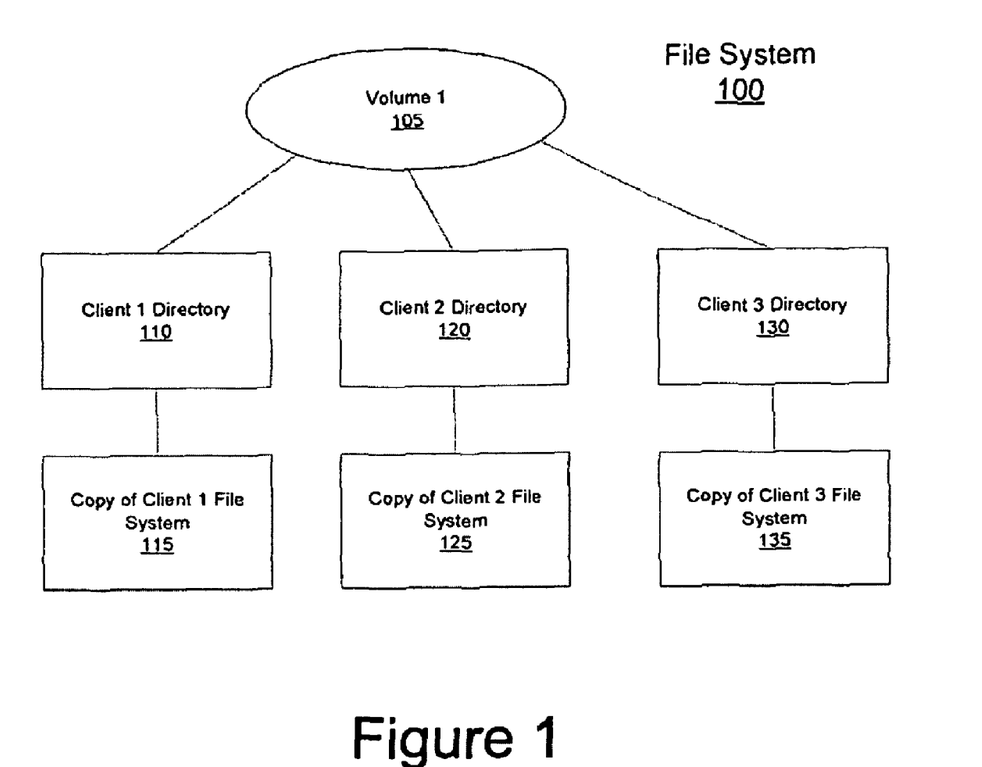
FIG. 1 illustrates an exemplary file system of backup storage system configured to coalesce a plurality of data collections in accordance with an embodiment of the present invention.

FIG. 1 illustrates an example of the organization of a file system 100 for a storage system. The file system includes one or more storage volumes 105, which are logical constructs that represent storage locations available in a collection of physical storage devices. Each storage volume 105 includes various directories 110, 120, 130, each of which is associated with a respective client. Hence, directory 110 is associated with a client 1, directory 120 is associated with a client 2, and directory 130 is associated with a client 3.

During a data backup operation, the storage system will replicate each client's respective file system into an appropriate corresponding directory. Thus, each client directory becomes, in essence, the root, or top-level, directory of a file system associated with the client. As a result of the backup operation then, each of the client directories 110, 120 and 130 will include a replica or backup of the respective client's file system: in particular, directory 110 will store a backup copy of the file system associated with client 1 (115), client 2 directory 120 will store a backup copy of the file system associated with client 2 (125), and client 3 directory 130 will store a backup copy for the file system associated with client 3 (135).

Figure 2:
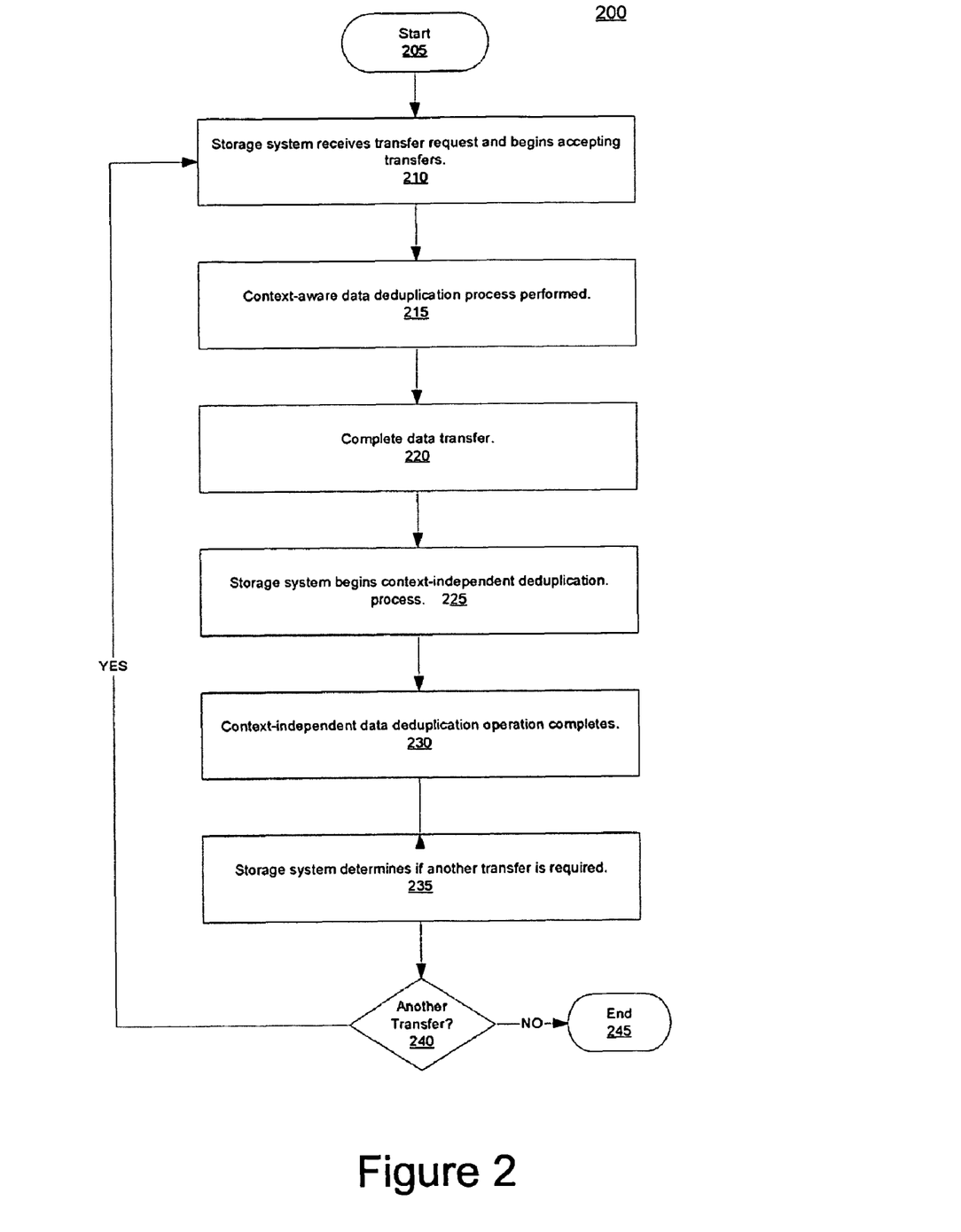
FIG. 2 is a flowchart detailing the steps of a procedure for managing data deduplication in a storage system in accordance with an embodiment of the present invention.

In order to eliminate data redundancies in the backup copies of the individual client file systems created as part of the backup process, the present invention employs a two-step data deduplication procedure that combines context-aware data deduplication and context-independent data deduplication. FIG. 2 is a flowchart detailing the steps of one such process 200 for managing this two-step data deduplication procedure in accordance with an embodiment of the present invention. Procedure 200 begins at step 205 and continues to step 210 where a request for a backup operation is received. As discussed below, this request may be received by the backup management module of a storage operating system executing on a storage system. As an example, the backup operation may be intended to archive a copy of the file system of one or more the storage system's clients.

The origin of the backup request may be a client communicatively coupled to the storage server (and here each such client may be regarded as a data source), or it may be an automated request generated by an application executing on the storage system. For example, the storage system may be configured to execute an application that provides for periodic backups at regular or other intervals. Such automated processes are commonly employed so that replica copies of data sets are routinely backed up in case of power failures or other events which can lead to data degradations in computer systems. By periodically backing up these data sets, computer systems can be quickly restored to last known operating conditions with only a minimal loss of data.

Regardless of the origin of the backup request, the storage system responds by preparing to generate a backup within the storage system's file system. Prior to any information being transferred to storage medium, however, a context-aware data deduplication operation is performed (step 215). This context-aware data deduplication operation will eliminate redundancies in the information to be stored at the data container (e.g., file) level. For example, assuming it is client 1 that has requested the backup operations, the storage system will compare data container level objects to be stored from client 1's file system with previously stored versions thereof. In each instance where an identical copy of a data container has already been stored to the storage system's file system (even if that data container has been stored in the context of a different directory), rather than store a new copy thereof, the storage system simply creates a pointer to that existing copy and stores the pointer as part of the backup version of client 1's file system.

Note that in practice it would be very cumbersome to compare actual file (or other data container) level objects so instead the context-aware data deduplication process may make comparisons based on representations of the data containers. In one embodiment, the representations comprise hashes of the data containers. A hash is the output of a hash function—a mathematical algorithm for turning relatively large data objects into relatively small data objects (usually integers) that may serve as an index. Each data container is subjected to the hash function (e.g., a well-known hash function such as MD5 or SHA-1) to produce a hash, and the hashes may then be quickly compared with one another rto determine if copies of particular data containers have already been stored by the storage system. If so, the data container need not be stored again and only a pointer is needed. Note, in order to avoid hash collisions (a rare situation where two different inputs to a hash function produce the dame output), multiple hash functions may be combined to produce a single output.

Once the context-aware data deduplication process is complete, the data transfer from the client file system to the storage system proceeds. Where the client file system data has been replaced by pointers to existing copies of data containers already stored by the storage system, those pointers are transferred. The resulting assembly of information will make up a copy of the client file system such as that illustrated in FIG. 1. The transfer completes at step 220. It should be noted that such data transfers may take a varying amount of time. That is, for example, a single data source may transfer a plurality of data collections, whereas each transfer may consume a different amount of time.

Once the data transfer is done, the storage system performs its second data deduplication operation—this time a context-independent data deduplication operation (step 225). The context-independent data deduplication operation operates below the data container level, for example at the data block level (here, a block may be any size less than a data container). As before, the storage system compares previously stored data objects with newly stored objects from the data transfer that just completed and when identical variants thereof are recognized one instance of the data object will be retained while the second (and subsequent) instance thereof will be replaced with a pointer to the saved version thereof. It is possible that this procedure can be repeated multiple time for a single data set at varying levels of granularity of data objects.

As was the case with data container level deduplication processes, it would be far too time consuming (and processor intensive) to compare actual instances of data objects with one another, so hashes or other representations of data objects may be used instead. The more granular the data object that is the target of the context-independent data deduplication process is, the larger the total index of such representation will be required. For example, data container-level data deduplication may require an index of millions, or even tens of millions, of unique hashes. Context-independent data deduplication at the block level will involve many more unique pieces of data, however, perhaps numbering into the billions of hashes. The larger index base demands greater processing resources than was required for the data container-level data deduplication and also takes longer to process.

At the completion of the second, context-independent data deduplication operation (step 230), each data object (e.g., block) stored on the storage medium should be unique, i.e., no two data objects should have identical data contained therein. At this point, the storage system checks to see if another data transfer has begun (step 235). A single backup operation may involve multiple information transfers between the client and the storage system, and so the storage system may perform the above-described two-step data deduplication process multiple times in a single backup operation. In each case, the backup procedure returns to step 210 and repeats from that point. If, however, no further information transfers are needed (240), the backup procedure completes (step 245).

In the context of the present invention, any combination of context-aware and context-independent data deduplication processes may be performed. That is, the present invention is not limited to the use of particular deduplication algorithms or mechanisms. Further, while the first time a data container (e.g., a file) is saved the context-aware data deduplication process will not result in any savings of storage space (because no existing context will exist on the storage system), future save operations should see marked space savings as it is generally the case that most data containers do not exhibit significant changes in sequential save operations.

Thus, the present invention provides systems and methods for managing data deduplication in a storage system. As will be discussed in greater detail below, in one embodiment of the present invention the backup process (and, hence, the data deduplication process) is instantiated in a backup management module of a storage operating system of a storage system. The backup management module may include a data deduplication module that is configured to implement the above-described data deduplication operations for one or more data collections (e.g., volumes or file systems) within the storage system.

Where such a storage operating system is used, the backup management module may be configured to initiate transfers of the data collections from a data source to a destination volume on the storage system in response to a transfer request from that data source. The data source itself may be another storage system, for example in a computer network or other computer system where multiple layers of storage systems are used. In such a case, the data deduplication operations may be used in the context of archive operations to a backup storage system.

In some instances, multiple data transfers may run in parallel, to back up multiple data sources to a common destination volume. Before any data from a source is written to disk, however, the data deduplication module of the backup storage system performs context-aware data deduplication to minimize redundancies in the data at the data container level. Thereafter, the data is written to disk and the data deduplication module performs a second operation, specifically a context-independent data deduplication operation, to eliminate data redundancies at the block (or lower data object) level. This two-pass data deduplication operation serves to minimize the number of redundant data objects present on the backup storage system. Following the data deduplication operations, the backup management module for the backup storage system may clean up any temporary data containers generated during the course of the data transfers.

Figure 3:
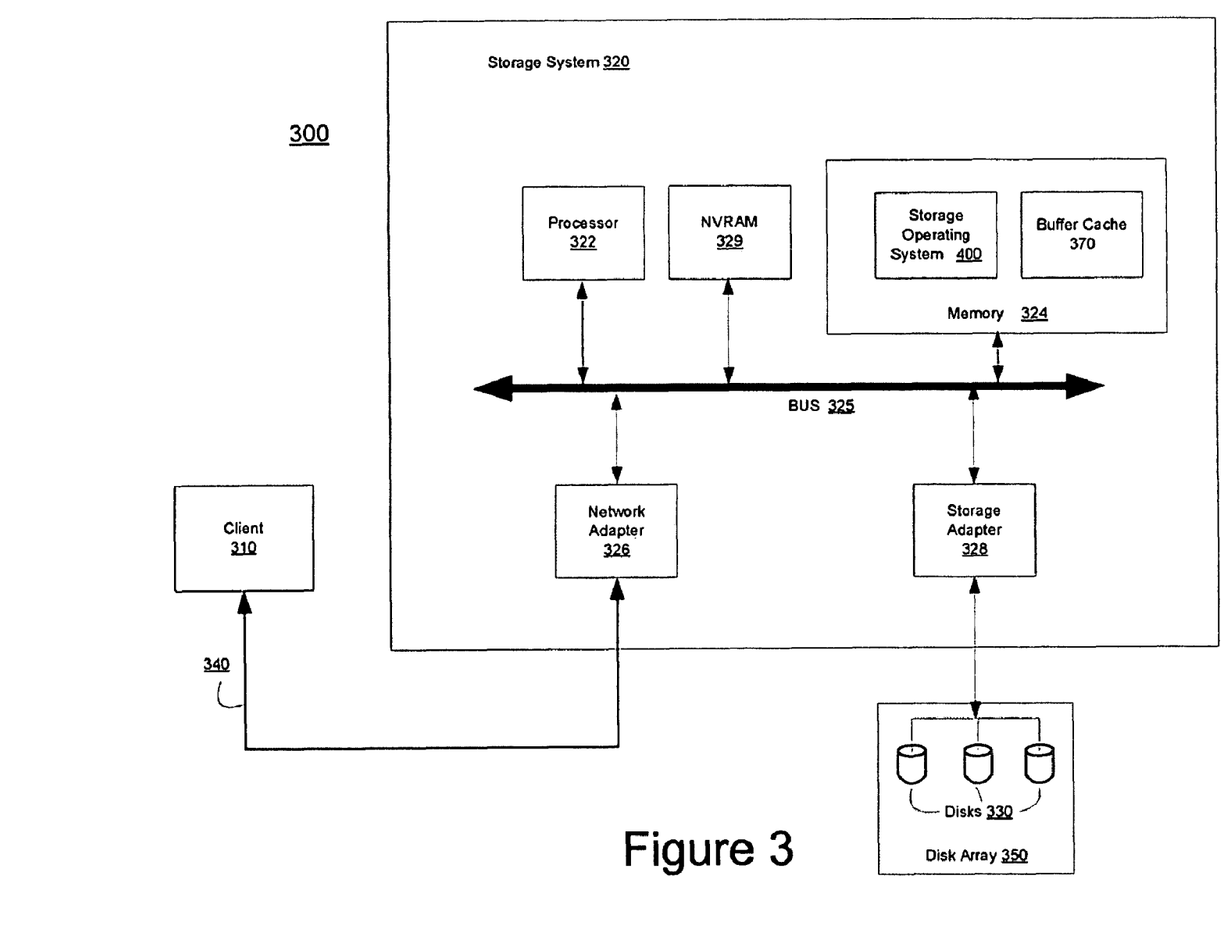
FIG. 3 illustrates a schematic block diagram of an exemplary environment that includes a storage system that may be advantageously used with the present invention.

This example of an environment in which the present invention finds application may be further understood with reference to FIG. 3. Here, a storage system environment 300 includes a client 310 (which, as indicated above, may be a storage system) communicatively coupled to a storage system 320 (which may be a backup storage system). The storage system 310 is a computer system that provides storage service relating to the organization of information on storage devices, such as disks 330 of a disk array 350. The storage system 320 includes a processor 322, a memory 324, a network adapter 326, a non-volatile random access memory (NVRAM) 329 and a storage adapter 328 interconnected by a system bus 325. The storage system 320 also includes a storage operating system 400 (described in greater detail below with reference to FIG. 4) that preferably implements a high-level organizational system, such as a file system, to logically organize information as a hierarchical structure of data containers (e.g., directories, files, etc.) on the disks 330. Note, in some cases, storage media other than or in addition to disks 330 may be used In this example, memory 324 is made up of storage locations that are addressable by the processor and adapted for storing software program code. A portion of the memory may be further organized as a buffer cache 370 for storing temporary data structures associated with the data deduplication operations of the present invention. For example temporary pointer lists and hashes may be stored in the buffer cache. Additionally, the NVRAM 329 may be utilized for temporary processing results.

The processor, storage adapter and network adapter may, in turn, include processing elements and/or logic circuitry configured to execute the software code and manipulate the various data structures in support of the methods of the present invention. Storage operating system 400, portions of which are typically resident in memory and executed by the processing elements, functionally organizes the storage system 320 by, among other things, invoking the data deduplication operations executed by the storage system.

The network adapter 326 includes the mechanical, electrical and signaling circuitry needed to connect the storage system 320 to client 310 over a computer network 340, which may be a point-to-point connection or a shared medium, such as a local area network. Illustratively, this computer network may be embodied as an Ethernet network or a Fibre Channel (FC) network. The client 310 may communicate with the storage system over such a network 140 exchanging information according to any convenient communication protocol, such as the Transmission Control Protocol/Internet Protocol (TCP/IP). As indicated above, client 310 may be a general-purpose computer configured to execute applications, or may itself be a storage system that utilizes the storage system 320 for backup operations (i.e., as a backup storage system). That is, storage system 320 may function as backup server to store archives/backups/mirrors of information stored by client 310. Thus, the client 310 may interact with the storage system 320 in accordance with a client/server model of information delivery.

The storage adapter 328 cooperates with the storage operating system 400 executing on the storage system 320 to read/write information from/to the storage media (e.g., disks 330). The information may be stored on any type of attached array of writable storage media such as video tape, optical, DVD, magnetic tape, bubble memory, electronic random access memory, micro-electro mechanical and any other similar media adapted to store information. However, as illustratively described herein, the information is preferably stored on the disks 330, such as hard disk drives (MD) and/or direct access storage device (DASD), of disk array 350. As mentioned above, these disks 330 may be organized as one or more storage volumes, each of which may be associated with its own file system.

Figure 4:
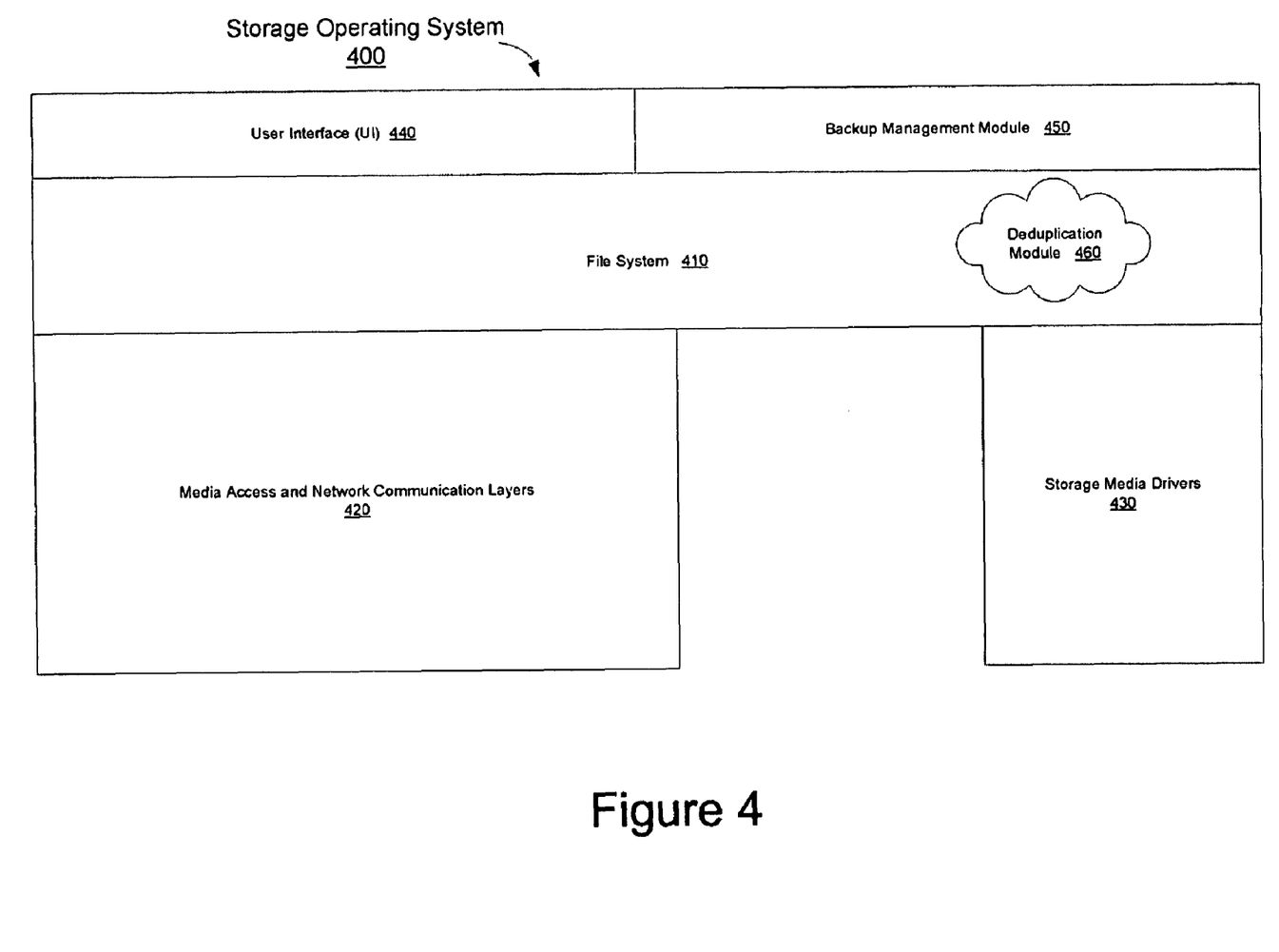
FIG. 4 is a schematic block diagram of an exemplary storage operating system that may be advantageously used with the present invention.

To facilitate access to the disks 330, the storage operating system 400, shown in greater detail in FIG. 4, implements a file system 410 that virtualizes the storage space provided by disks 330. That is, the file system 410 logically organizes information as a hierarchical structure of named data containers (e.g., directories, files, etc.) on the disks 330. In this context, directories are data containers specially formatted to contain names and links to other data containers. In one embodiment, the storage operating system 400 is the NetApp® Data ONTAP® operating system available from Network Appliance, Inc., Sunnyvale, Calif., however, it is expressly contemplated that any appropriate storage operating system may be used in accordance with the principles described herein.

In addition to the file system 410, storage operating system 400 includes a series of software layers organized to form an integrated network protocol stack or, more generally, a multi-protocol engine that provides data paths for clients (such as client 310) to access information stored on the storage system. For the most part, these protocol layers will not be described in detail herein so as not to unnecessarily obscure the present invention. For example, a variety of media access and network communication layers 420 provide communications between the file system 410 and the network adapter(s) 326. Also, various storage media drivers 430 provide communication between the file system 410 and the storage media, such as disks 330. The precise details of these layers is not critical to the present invention.

File system 410 bridges the media access and other network protocol stack layers to provide a virtualized representation of the storage media and the network interfaces to/from the storage system 320. The file system 410 may be accessed through various interfaces, such as a user interface (UI) 440, which provide administrative access to the storage operating system. As mentioned, the file system 410 provides logical volume management capabilities for use in connection with accesses to the information stored on the storage devices, such as disks 330. Thus, the file system 410 is responsible for (i) aggregation of the storage media, (ii) aggregation of storage bandwidth of the storage media, and (iii) reliability guarantees associated with the storaging of information to those storage media.

Operationally, a request from the client 310 is forwarded over the computer network 340 to the storage system 320, where it is received at the network adapter 326. An appropriate (depending on the communication protocol used by network 340) module of media access and network communication layer 420 processes the request and, if appropriate, passes it up through the network protocol stack for additional processing prior to forwarding the request to file system 410. In response, the file system 410 generates operations to load (retrieve) the requested information from the storage media (e.g., disks 330) if that data is not already resident in memory 324 (e.g., in the buffer cache 370). The storage media drivers 430 accesses the information from the specified disk(s) and load the requested data in buffer cache 370 for processing by the storage system 320. Upon completion of the request, the storage system (and storage operating system) returns a reply to the client 310 over the network 340.

It should be noted that the software "path" through the storage operating system layers described above may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 320 in response to a request issued by client 310. Moreover, in another alternate embodiment of the invention, the processing elements of adapters 326, 328 may be configured to offload some or all of the packet processing and storage access operations, respectively, from processor 322, to thereby increase the performance of the storage service provided by the system. It is expressly contemplated that the various processes, architectures and procedures described herein can be implemented in hardware, firmware or software.

Also included as part of the storage operating system 400 is a backup management module 450, which manages backup operations for the storage system 310. The backup management module 450 cooperates with a deduplication module 460 of the file system 410 to implement data deduplication operations in accordance with the above-described procedures. That is, the deduplication module 460 implements the two-step data deduplication process facilitated by the present invention. During such operations, as data is backed up to a disk or other rstorage medium, a catalog of the data is built. This catalog or repository indexes individual bits of data, assigns a metadata reference thereto, and stores same on the storage medium. This catalog is used on subsequent backups to identify which data elements (e.g., data containers or smaller data objects) are unique. Nonunique data elements are not backed up, instead being replaced with ointers as discussed above; unique ones are committed to the storage medium.

In the context of the process discussed above with reference to FIG. 2, the two step data deduplication operation may commence when the backup management module 450 receives a transfer request from a client and begins accepting data transfers from that client. That is, a client (i.e., a data source) may transmit a request to the backup management module 450 indicating that it is to begin a new backup operation. In response, the backup management module 450 receives the transmitted data from the data source and prepares to generate a backup within the storage system's file system.

Prior to the data being committed to the storage medium, the context-aware data deduplication operation is performed. The result is context-aware deduplicated data, which is committed to the storage medium. Once the context-aware deduplicated data has been so committed, the backup management module 450 alerts the data deduplication module 460 to perform the second data deduplication operation; this time a context-independent data deduplication operation. At the completion of this second, context-independent deduplication operation, the result is context-independent deduplicated context-aware deduplicated data. This resulting information is stored on the storage medium and each block thereof should now be unique, i.e., no two data blocks should have identical data contained therein.

Once the deduplication procedure is complete, the deduplication module 460 alerts the backup management module 450. The backup management module 450 determines if another transfer has begun, and, if so, the above-described procedure repeats. If, however, no further transfer has begun, the backup procedure completes.

In the context of the present invention, any combination of context-aware and context-independent data deduplication processes may be performed. That is, the present invention is not limited to the use of particular deduplication algorithms or mechanisms. Further, while the first time a file is saved the context-aware data deduplication process will not result in any savings of storage space (because no existing context will exist on the storage system), future save operations should see marked space savings as it is generally the case that most files do not exhibit significant changes in sequential save operations.

As described above, the present two-step data deduplication process may use a variety of technoiques to identify unique information. For example, hashes may be used to determine whether data objects are unique. Alternatively, or in addition, pattern-matching and differencing algorithms that identifies duplicate data may be used. At a very high level, data container names can be used to determine whether or not instances thereof already exist on the storage media. All such techniques are contemplated for use in accordance with the present invention.

When implemented as described herein, the present two-step data deduplication process reduces the amount of storage space that would be required if either the context-aware or context-independent data deduplication processes were used alone. Such efficient use of storage medium space allows for information to be retained for longer periods than might otherwise be the case, which offers better opportunities for recovery should information be otherwise lost.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software (including a computer-readable medium having program instructions executing on a computer), hardware, firmware, or a combination thereof. Additionally, while this description has been written in terms of a file system, the present invention may be utilized with non-file system storage systems.

In addition, it should be understood that the techniques described herein may apply to any type of special-purpose (e.g., file server, filer or multi-protocol storage appliance) or general-purpose computer, including a standalone computer or portion thereof, embodied as or including a storage system. Moreover, the present invention can be adapted to a variety of storage system architectures including, but not limited to, a network-attached storage environment, a storage area network and a disk assembly directly attached to a client or host computer. The term storage system as used herein should, therefore, be taken broadly to include all such arrangements in addition to any subsystems configured to perform a storage function and associated with other equipment or systems. For example, a storage system may include one or more storage devices into which information may be entered, and from which information may be obtained, as desired.

Of course, the examples presented above are intended only to illustrate the operation of the present invention and should not be read as limiting environments for the use of same. One particular example involved a backup storage system environment, however, the principles of the present invention may be utilized in many other environments. For example, the present invention may find applications in environments such as a database management system, an e-mail system (involving multiple clients and servers), and others.

Furthermore, while the foregoing examples have been written in terms of data deduplication during storage operations, the principles of the present invention may be utilized to provide data deduplication in connections with transmissions over communication links. In such cases, a sending system may implement the above described two step data deduplication process to minimize the amount of bandwidth utilized in transmitting data. Such communication-based data deduplication may occur when, for example, a backup hierarchy is formed, with data being backed up to a first storage system, which is, in turn, backed up to a second storage system. In such a case, the data deduplication at the first storage system results in a reduced amount of bandwidth consumed in the later backup operation to the second storage system.

Accordingly the foregoing description should be taken only by way of example and not to otherwise limit the scope of the invention, which should be measured only in terms of the claims.

What is claimed is:

1. A method for performing an at least two-phase data deduplication process, comprising:
    performing a context-aware data deduplication during a data storage operation to obtain context-aware deduplicated data prior to committing the data to a storage medium, the context-aware data deduplication comprising comparing data container level objects in the data with previously stored versions thereof on the storage medium using hash representations of the data container level objects and, for respective instances of identical copies of the data container level objects already stored to the storage medium, creating a pointer to an existing copy of a subject data container level object, and storing the pointer in lieu of the subject data container level object;
    committing the context-aware deduplicated data to the storage medium;
    performing a context-independent data duplication operation on the committed context-aware deduplicated data subsequent to committing the context-aware deduplicated data to obtain context-independent deduplicated context-aware deduplicated data; and
    committing the context-independent deduplicated context-aware deduplicated data to the storage medium.

2. The method of claim 1, comprising performing the context-aware data deduplication in response to an indication from a backup management module that the data storage operation is to commence.

3. The method of claim 2, comprising performing the context-independent data deduplication operation in response to an indication from the backup management module that the context-aware deduplicated data has been committed to the storage medium.

4. The method of claim 1, the data storage operation comprising a data backup operation for a storage system.

5. The method of claim 1, the context-aware data deduplication comprising file-level data deduplication.

6. The method of claim 5, the context-independent data deduplication comprising block-level data deduplication.

7. The method of claim 1, the comparing data container level objects comprising comparing representations of the data container level objects.

8. The method of claim 7, the representations comprising hashes of the data container level objects.

9. The method of claim 1, the context-independent data deduplication comprising comparing data objects smaller than a data container in the context-aware deduplicated data with previously stored versions thereof on the storage medium and, for respective instances of identical copies of the data objects already stored to the storage medium, creating a pointer to a respective existing copy of a subject data object and storing the pointer in lieu of the subject data object as part of the data storage operation.

10. The method of claim 9, the comparing data objects comprising comparing representations of the data objects.

11. The method of claim 10, the representations of the data objects comprising hashes of the data objects.

12. A storage system, comprising a processor communicatively coupled to a memory storing a storage operating system comprising a data deduplication module configured to perform an at least two-phase data deduplication process, comprising:
    performing a context-aware data deduplication during a data storage operation to obtain context-aware deduplicated data prior to committing the data to a storage medium, the context-aware data deduplication comprising
    comparing data container level objects in the data with previously stored versions thereof on the storage medium using hash representations of the data container level objects and, for respective instances of identical copies of the data container level objects already stored to the storage medium, creating a pointer to an existing copy of a subject data container level object, and storing the pointer in lieu of the subject data container level object;
    committing the context-aware deduplicated data to the storage medium;
    performing a context-independent data duplication operation on the committed context-aware deduplicated data subsequent to committing the context-aware deduplicated data to obtain context-independent deduplicated context-aware deduplicated data; and
    committing the context-independent deduplicated context-aware deduplicated data to the storage medium.

13. The storage system of claim 12, the storage operating system comprising a backup management module configured to signal the data deduplication module to perform the context-aware and context-independent data deduplications.

14. The storage system of claim 13, the backup management module configured to signal the data deduplication module to perform the context-aware data deduplication in response to an indication a data transfer from a data source is about to begin.

15. The storage system of claim 14, the backup management module configured to signal the data deduplication module to perform the context-independent data deduplication in response to an indication that the context-aware deduplicated data has been committed to the storage medium.

16. The storage system of claim 12, the data deduplication module comprised within a file system for the storage operating system.

17. A computer-readable storage medium having stored thereon computer-readable instructions, which instructions when executed by a computer processor cause the computer processor to perform an at least two-phase data deduplication process comprising:
    performing a context-aware data deduplication during a data storage operation to obtain context-aware deduplicated data prior to committing the data to a storage medium, the context-aware data deduplication comprising comparing data container level objects in the data with previously stored versions thereof on the storage medium using hash representations of the data container level objects and, for respective instances of identical copies of the data container level objects already stored to the storage medium, creating a pointer to an existing copy of a subject data container level object, and storing the pointer in lieu of the subject data container level object;
    committing the context-aware deduplicated data to the storage medium;
    performing a context-independent data duplication operation on the committed context-aware deduplicated data subsequent to committing the context-aware deduplicated data to obtain context-independent deduplicated context-aware deduplicated data; and
    committing the context-independent deduplicated context-aware deduplicated data to the storage medium.

18. The method of claim 17, the context-independent data deduplication comprising comparing data objects smaller than a data container in the context-aware deduplicated data with previously stored versions thereof on the storage medium and, for respective instances of identical copies of the data objects already stored to the storage medium, creating a pointer to a respective existing copy of a subject data object and storing the pointer in lieu of the subject data object as part of the data storage operation.

* * * * *